(12) United States Patent  
Spence et al.

(10) Patent No.: US 6,587,630 B2
(45) Date of Patent: Jul. 1, 2003

(54) OPTICAL BACKPLANE CARTRIDGE

(75) Inventors: David Lathrop Spence, Monroe, CT (US); Christopher Patrick Carey, Rocky Hill, CT (US)

(73) Assignee: Sycamore Networks, Inc., Chelmsford, MA (US)

( * ) Notice: Subject to any disclaimer, the term of this patent is extended or adjusted under 35 U.S.C. 154(b) by 25 days.

(21) Appl. No.: 09/872,791

(22) Filed: Jun. 1, 2001

(65) Prior Publication Data

US 2002/0181918 A1 Dec. 5, 2002

(51) Int. Cl.$^7$ .................................................. G02B 6/00
(52) U.S. Cl. ....................................................... 385/134
(58) Field of Search ................................ 385/134, 135, 385/136, 137

(56) References Cited

U.S. PATENT DOCUMENTS

| | | | | |
|---|---|---|---|---|
| 4,595,255 A | * | 6/1986 | Bhatt et al. ................. | 385/135 |
| 4,863,232 A | * | 9/1989 | Kwa ........................... | 385/135 |
| 5,283,851 A | * | 2/1994 | Vergnolle ................... | 385/134 |
| 5,793,919 A | * | 8/1998 | Payne et al. ................ | 385/135 |
| 5,937,133 A | * | 8/1999 | Moss et al. ................. | 385/137 |

* cited by examiner

Primary Examiner—Robert H. Kim
Assistant Examiner—Therese Barber
(74) Attorney, Agent, or Firm—Lahive & Cockfield, LLP

(57) ABSTRACT

An apparatus for supporting and protecting the optical backplane that permits adequate cooling of electronic components near the optical backplane and maintains optical connectors of the optical backplane in a predetermined and substantially static arrangement is provided. A cartridge for supporting and arranging an optical backplane includes a base. An upper portion couples with the base. The upper portion has one or more optical connector slots for supporting one or more optical connectors of the optical backplane. The optical backplane mounts within the upper portion such that the upper portion together with the base bends the optical backplane to a curvature having a radius of curvature within a predetermined acceptable range.

17 Claims, 6 Drawing Sheets

OPTICAL BACKPLANE CARTRIDGE

FIELD OF THE INVENTION

The invention relates to an optical component, and more particularly to an optical backplane cartridge for supporting and protecting an optical backplane.

BACKGROUND OF THE INVENTION

Optical nodes typically include a collection of fiber optic lines in combination with various optical components. One example of an optical node is an optical switch. An optical switch often includes backplane. The backplane is a structure typically located at the rear of the switch to which modules and cables connect. The modules may include circuits, processors, or other types of components. The cables may include fiber optic cable.

Optical connectors supply the optical signal to the backplane. The optical connectors plug into optical housings disposed on the backplane, and transmit optical signals to the backplane, through the optical housings.

The optical connectors can extend from the optical backplane in a number of different ways, as long as the optical fibers leading to the connectors do not bend in a tighter or smaller radius of curvature than about 1 inch, according to limitations of current fiber technology. A tighter or smaller radius of curvature could cause fracture of the optical fibers. The optical fibers must be protected in making the connections to the backplane from excessive manipulation that may compromise the relatively delicate optical fibers encased within the optical backplane.

Another desire in making the connection of the optical fibers to the backplane is to avoid a jumble or entanglement of optical fibers extending from various locations within the optical switch or node to the backplane. Excessive entanglement makes it more difficult to avoid unwanted manipulation of the fibers.

In addition, if the fibers are not clearly marked and organized, the connection of the fibers to the backplane becomes more difficult during installation. In fact, the optical backplanes found in optical switches require repair or replacement from time to time. The optical backplanes can include a plurality of optical connectors, each of which require proper placement and connection/disconnection from the particular plane to which they connect. If the leads to the optical connectors can move about freely and become entangled, it becomes more time consuming to ensure that each optical connector is properly positioned and connected/ disconnected without accidentally damaging the optical fibers of the optical backplane during installation or removal.

SUMMARY OF THE INVENTION

There is a need for a structure for supporting and protecting the optical backplane that also permits adequate cooling of the electrical components in the optical switch and maintains optical connectors of the optical backplane in a predetermined and substantially static arrangement. The invention provides further solutions to address this need, and others not specifically noted.

In accordance with one example embodiment of the invention, a cartridge for supporting and arranging an optical backplane includes a base. An upper portion couples with the base. The upper portion has one or more optical connector slots for supporting one or more optical connectors of the optical backplane.

The optical backplane mounts within the upper portion such that the upper portion bends the optical backplane to a curvature having a radius of curvature within a predetermined range. The predetermined range of curvature can approximate greater than 1 inch.

The one or more optical connector slots, according to one embodiment of the invention, have the appropriate size and dimensions to frictionally support the one or more optical connectors.

The cartridge is made of a material such as metal, plastic, composite, ceramic, and the like.

The cartridge can further include one or more optical card slots disposed in the upper portion for supporting one or more optical cards (e.g., daughter cards). The one or more optical card slots, according to one embodiment of the invention, have the appropriate size and dimensions to frictionally support at least a portion of the one or more optical cards.

The cartridge, according to still another embodiment of the invention, also has the appropriate size and dimensions to promote a flow of air through the cartridge to facilitate and aid in the cooling of the electrical components.

An optical component, according to another aspect of the invention, includes a housing. There is at least one plane disposed within the housing. A cartridge disposed within the housing is proximal to the at least one plane. An optical backplane disposed within the cartridge, such that one or more optical connectors coupled with the optical back plane are supported by the cartridge, and the one or more optical connectors further couple with the at least one plane.

The base of the cartridge, according to one embodiment of the invention, couples with the housing, utilizing at least one locking or fastening device or an adhesive.

BRIEF DESCRIPTION OF THE DRAWINGS

The aforementioned features and advantages, and other features and aspects of the invention, will become better understood with regard to the following description and accompanying drawings, wherein.

DETAILED DESCRIPTION

Figure 1A:
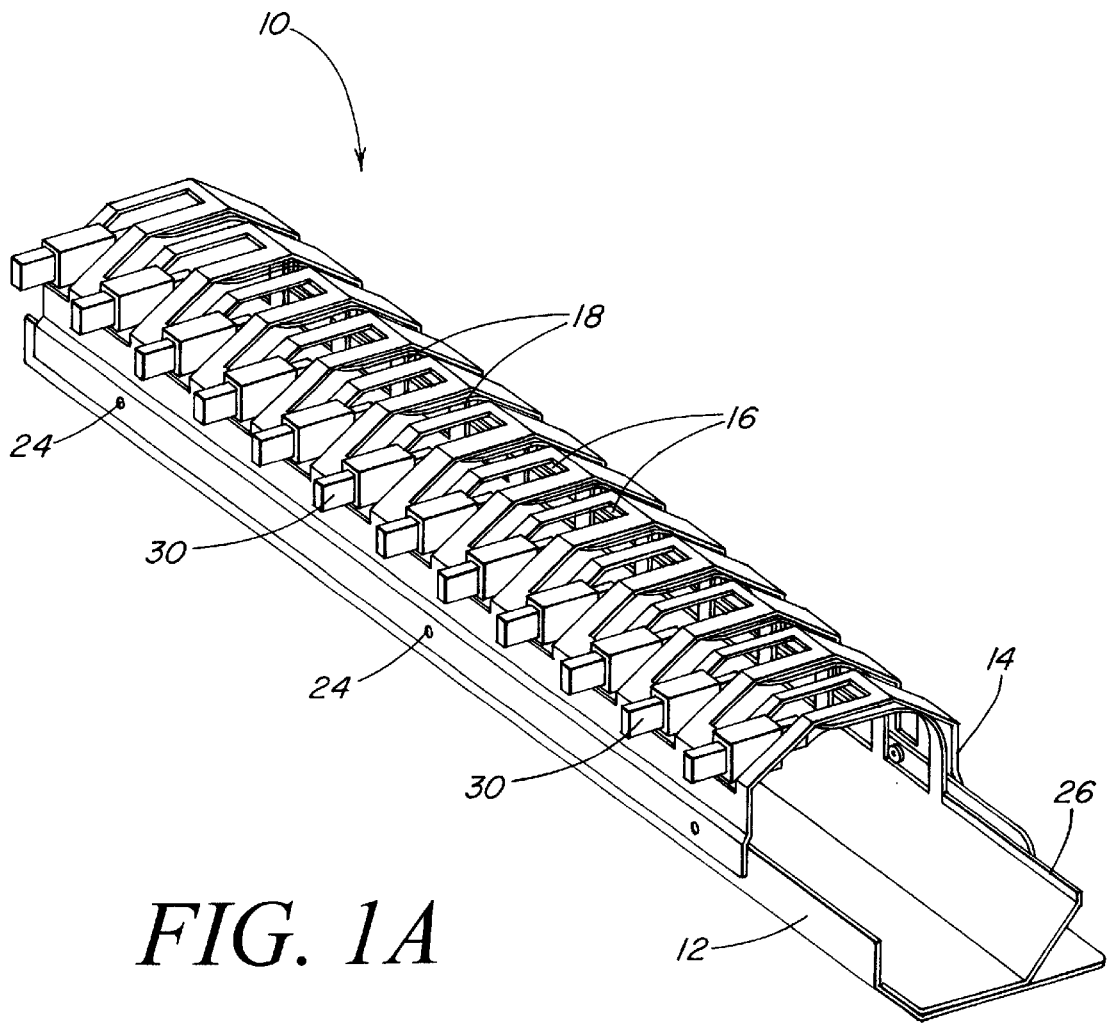
FIG. 1A is a perspective illustration of an optical backplane cartridge according to one aspect of the present invention.

An illustrative embodiment of the present invention relates to an optical backplane cartridge for use with optical components. The optical cartridge provides support for an optical backplane mounted within the optical cartridge. Optical connectors extending from the optical backplane are disposed within slots of the optical cartridge. The slots of the optical cartridge help to position the optical connectors to connect with, e.g., midplanes or backplanes of the electro/optical or optical components, and to avoid unwanted fiber entanglements. The interior dimensions of the optical cartridge are such that the optical cartridge structure supports and maintains the optical backplane in a curved arrangement having a predetermined radius of curvature that is at least as long as that allowable for the fiber. The optical cartridge holds the optical backplane in place, protecting the optical backplane, and enhancing the flow of air through and around the optical backplane for cooling of electronic components.

FIGS. 1 through 5, wherein like parts are designated by like reference numerals throughout, illustrate an example embodiment of an optical backplane cartridge according to the present invention. Although the present invention will be described with reference to the example embodiment illustrated in the figures, it should be understood that many alternative forms can embody the invention. One of ordinary skill in the art will additionally appreciate different ways to alter the parameters of the embodiments disclosed, such as the size, shape, or type of elements or materials, in a manner still in keeping with the spirit and scope of the present invention.

Figure 1B:
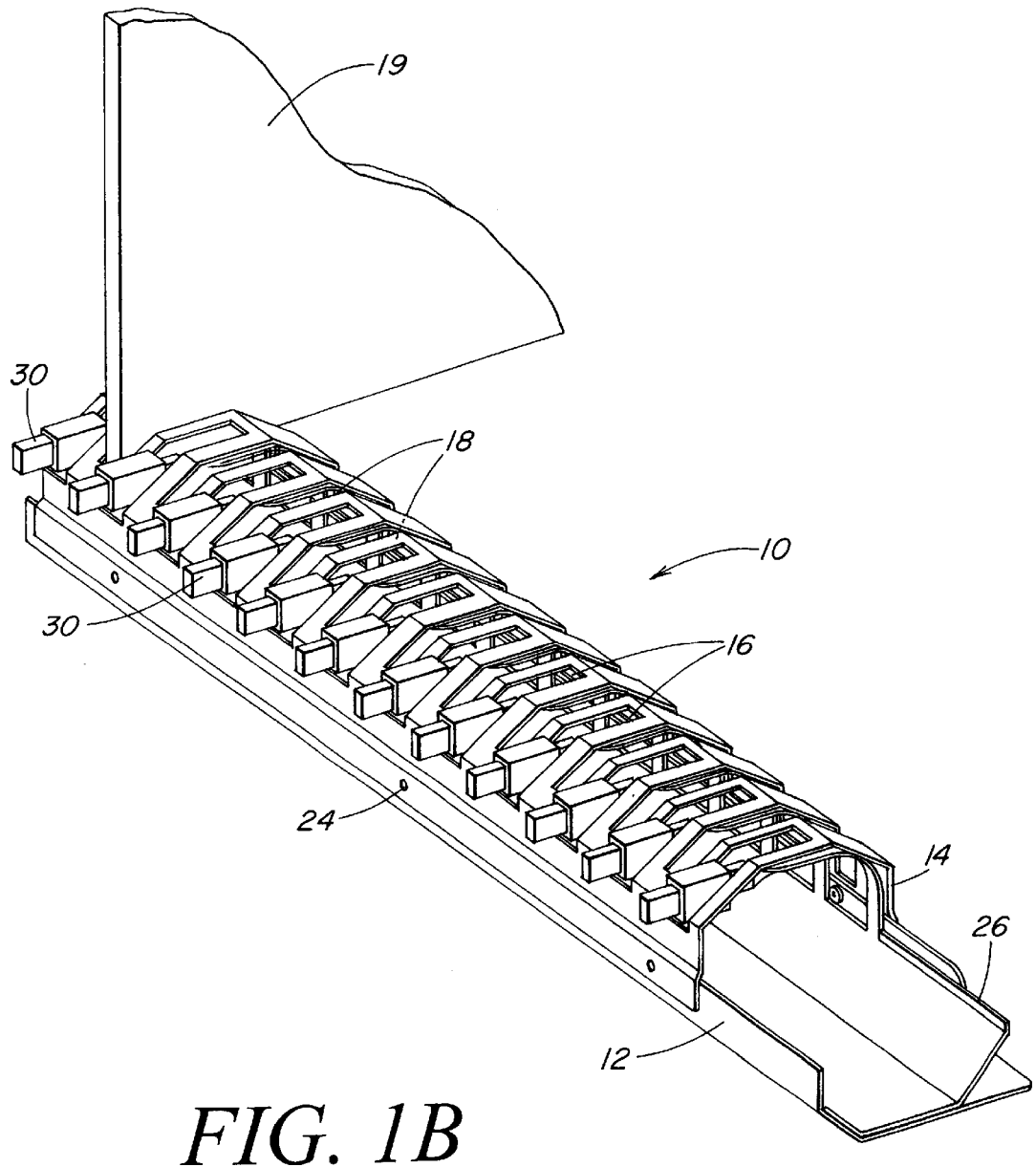
FIG. 1B is a perspective illustration of the optical backplane cartridge according to another aspect of the present invention.

FIGS. 1A and 1B illustrate one embodiment of an optical backplane cartridge 10. The cartridge includes a base 12 coupled with an upper portion 14, utilizing one or more locking or fastening devices 24. The two-piece arrangement of the base 12 and the upper portion 14 is merely one example structure for forming the optical backplane cartridge 10 as understood by one of ordinary skill in the art. The cartridge 10 can alternatively have a unibody construction, or can utilize more than two separate pieces to form the entire structure of the optical cartridge 10.

The upper portion 14 of the cartridge 10 includes a plurality of optical connector slots 16. The optical connector slots 16 guide and support optical connectors 30 of an optical backplane 26, as will be further discussed later herein. The optical connector slots 16 are generally rectangular in shape as seen from a point in space directly above the upper portion 14, however the slots can take many different forms such as oval, triangular, and the like. The optical connector slots 16 extend generally from a top portion of the upper portion 14, and approximately halfway down a front side of the upper portion 14. The position and length of the optical connector slots 16 can vary greatly, while still allowing the optical connectors 30 of the optical backplane 26 to pass through the slots to predetermined locations on a backplane 36.

The term "backplane" as utilized herein and referred to with reference number "36" is intended to mean what is commonly known as a backplane (a plane or board containing one or more circuits that connects with other boards or connectors), as well as a mid-plane or plane of other orientation having the same function and purpose as a known backplane.

A plurality of optical card slots interleave with the plurality of optical connector slots 16 in the upper portion 14. The optical card slots 18 serve as a guide to position and support, e.g., one or more optical cards 19, as later discussed herein. The rectangular shaped optical card slots 18 extend from an upper portion of the front side of the upper portion 14 where the optical connectors 30 are disposed, and across the top of the upper portion 14 to terminate toward a lower portion of the back side of the upper portion 14. The shape of the optical card slots 18, which can vary, facilitates the insertion of an optical card 19 into the cartridge 10 from behind the cartridge (i.e., on a side of the cartridge opposite the front side where the optical connectors 30 extend out of the upper portion 14) (see FIG. 1B). A front edge 21 of each slot 18 supports the optical card 19, while a back edge of each slot 18 acts as a stopper to position the optical cards 19 appropriately.

Figure 2:
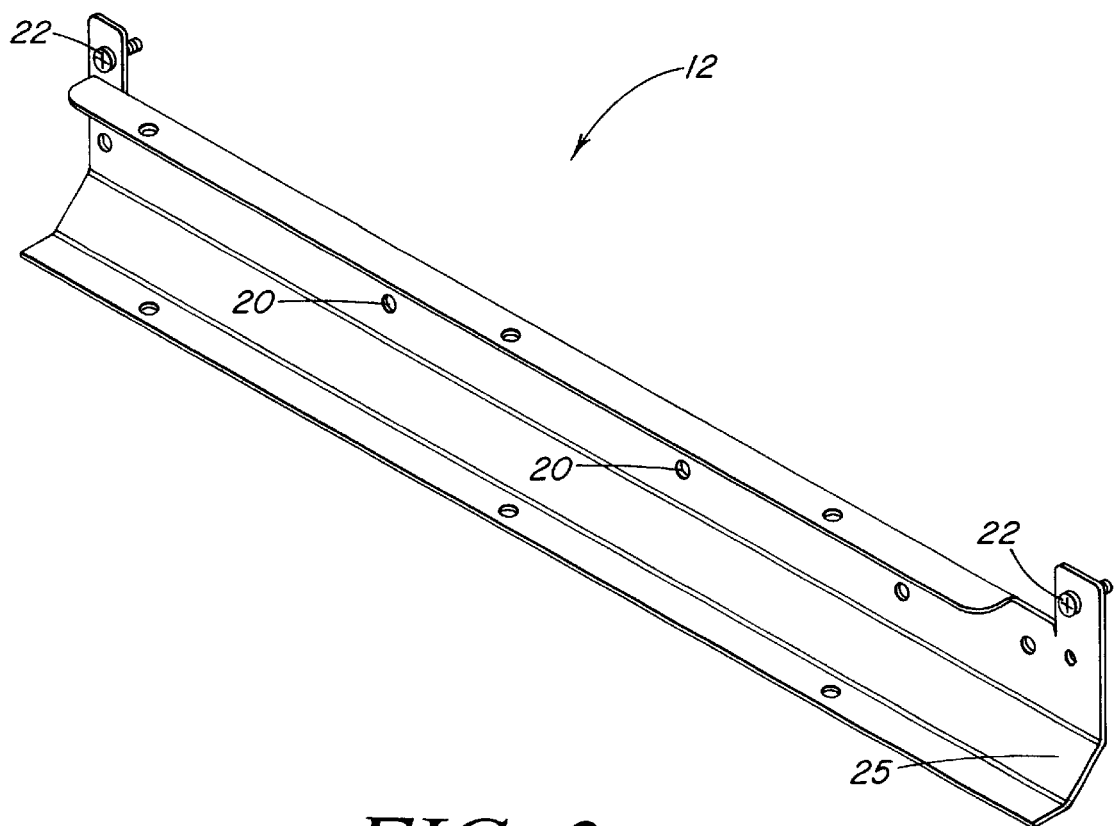
FIG. 2 is a perspective illustration of a base of the cartridge of FIG. 1 according to one aspect of the present invention.

FIG. 2 illustrates one example embodiment of the base 12 of the cartridge 10. The base 12 extends from one end of the cartridge 10 to the other, however the base 12 can maintain a different length from the upper portion 14 (e.g., longer or shorter). The base 12 can also be solid or contain any number of different sized openings. The base 12 includes one or more threaded apertures 20 for mounting the base 12 of the cartridge 10 to a structure, or alternatively for mounting other items such as e.g., an optical backplane, to the base 12 of the cartridge 10. The base 12 can mount to a variety of different structures utilizing a variety of known fastening methods, mechanisms, and devices, such as threaded fasteners, pin fasteners, rivets, clamps, brackets, hook and loop fasteners, hinges, welds, adhesives, magnetics, and the like.

The base 12 further includes one or more thumbscrews 22 for mounting the base 12 to a structure. The thumbscrews 22 extend from tab portions of the base 12. The thumbscrews 22 enable a technician to place the cartridge 10 in a desired location having threaded apertures (not shown) that line up with the thumbscrews 22, and easily screw the thumbscrews 22 into the threaded apertures to mount the cartridge 10 in place. The thumbscrews 22 are merely one approach to mounting the cartridge 10. Other known fastening mechanisms and devices as previously listed can also be used to mount the cartridge as desired.

An angled wall 25 forms one wall of the base 12 structure. The angled wall 25 facilitates the bending of the optical backplane 26 into the desired radius of curvature. When the optical backplane 26 is installed into the cartridge 10, the angled wall 25 effects a supported curvature of the optical backplane 26 as will be further discussed herein. The angle of the angled wall 25 can vary, but should be sufficient to appropriately support the optical backplane 26 while in the curved arrangement.

Figure 3:
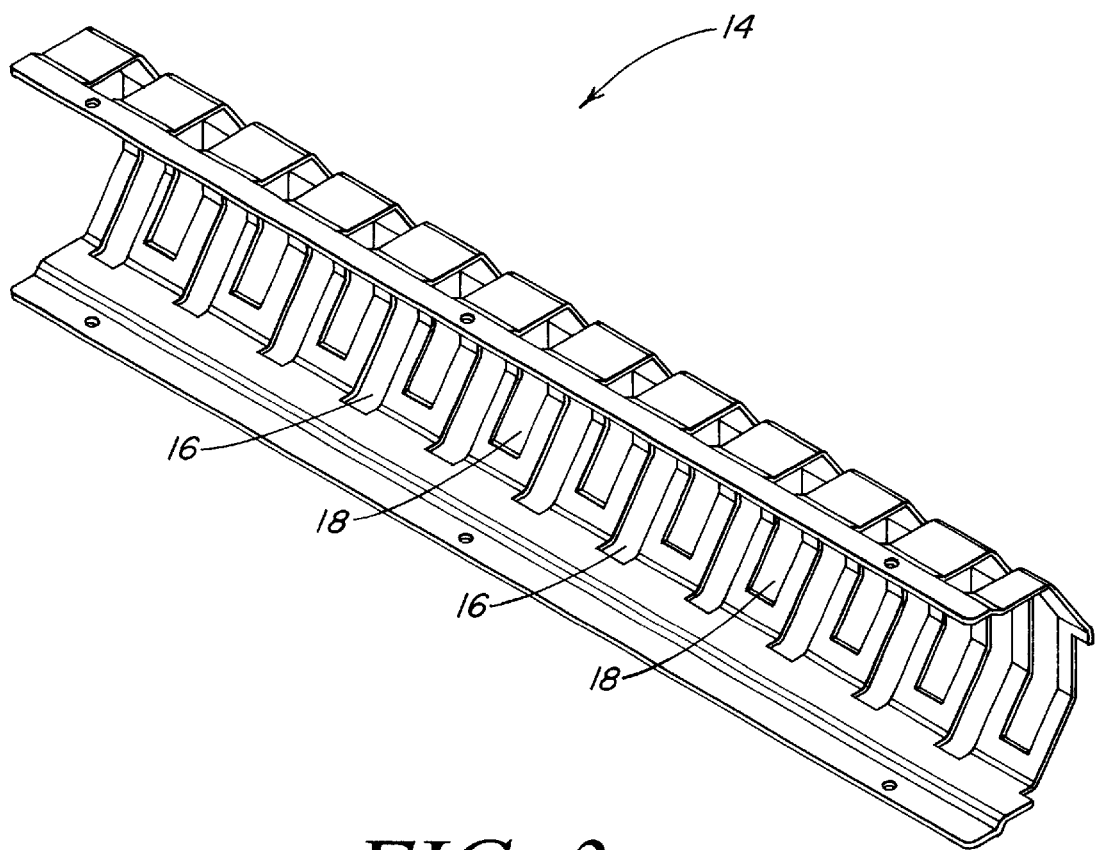
FIG. 3 is a perspective illustration of an upper portion of the cartridge of FIG. 1 according to one aspect of the present invention.

FIG. 3 illustrates the upper portion 14, which extends from approximately one end of the base 12 to the other end of the base 12. The upper portion 14, as previously mentioned, can maintain a different length from that of the base 12. The upper portion 14 includes the optical connector slots 16 and the optical card slots 18 as illustrated. However, the upper portion 14 can include a number of different slots and/or apertures for mounting and/or supporting a number of components relating to the optical backplane 26 disposed within the cartridge 10.

The optical backplane cartridge 10, including the base 12 and the upper portion 14, can be made of a number of different materials, including metal, plastic, composite, ceramic, and the like. Further, the base 12 can couple with the upper portion 14 of the cartridge 10 through use of a number of different types of locking or fastening devices, or adhesives, as understood by one of ordinary skill in the art.

Figure 4:
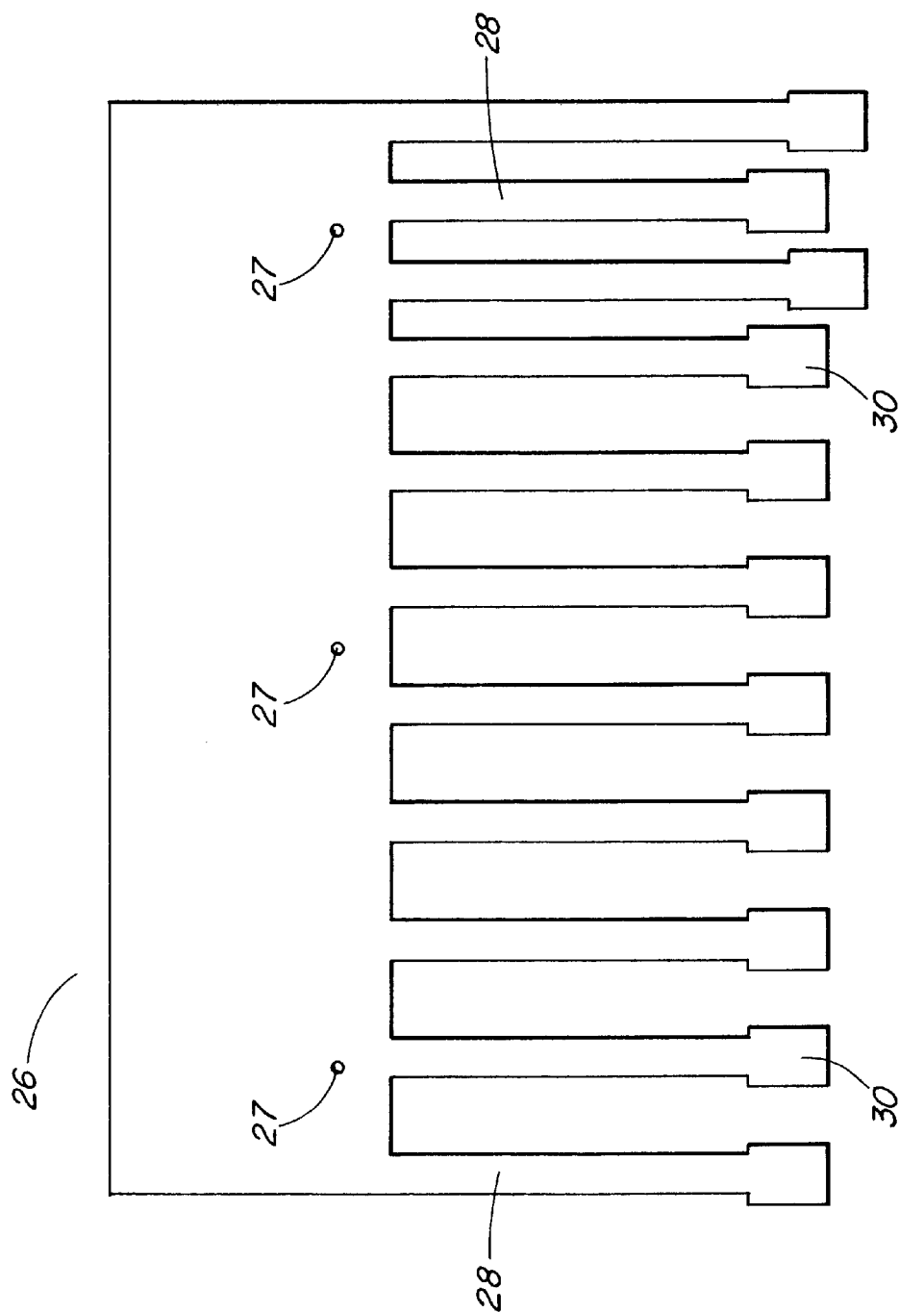
FIG. 4 is a diagrammatic illustration of an optical backplane according to one aspect of the present invention.

FIG. 4 illustrates one example embodiment of the optical backplane 26. The optical backplane 26 includes a series or plurality of optical leads 28. Each lead 28 couples with an optical connector 30. The optical backplane 26 can be made of a high temperature flexible plastic, such as Kapton (manufactured by E. I. Dupont de Nemours Co. of Wilmington, Del.). One example flexible circuit optical backplane is made by Molex, Incorporated. A plurality of optical fibers (not shown) extend throughout different sections of the optical backplane 26 and down each of the plurality of optical leads 28. Certain of the optical leads 28 provide input optical signals to the optical backplane 26, while certain other of the optical leads 28 provide output optical signals from the optical backplane 26.

A plurality of apertures 27 are disposed along a main body portion of the optical backplane 26. These apertures 27 serve to provide locations for fastening devices to pass through the optical backplane 26 for installation. The apertures 27 can guide the proper placement of the fastening devices when provided, however the apertures are not required prior to installation. The particular fastening device or mechanism can create its own aperture in the optical backplane 26. In addition, the particular placement of the apertures 27 is merely illustrative. The exact position of the apertures 27 can vary with embodiment.

The main body of the optical backplane 26, as well as each of the optical leads 28, contains optical fibers that cannot bend past a predetermined radius of curvature without breaking the fibers. The optical backplane 26, therefore, has a minimum allowable radius of curvature that it can bend to without breaking the fibers. In the optical backplane 26 of the illustrated embodiment of the present invention, the minimum allowable radius of curvature is approximately 1 inch. This radius of curvature can vary with the particular optical backplane product, the optical fibers contained within, and the structure of the optical backplane. Therefore, the minimum radius of curvature of 1 inch is merely illustrative, and the size and dimensions of the structure of the present invention can vary to accommodate different radius of curvature requirements without departing from the spirit and scope of the present invention.

Figure 5:
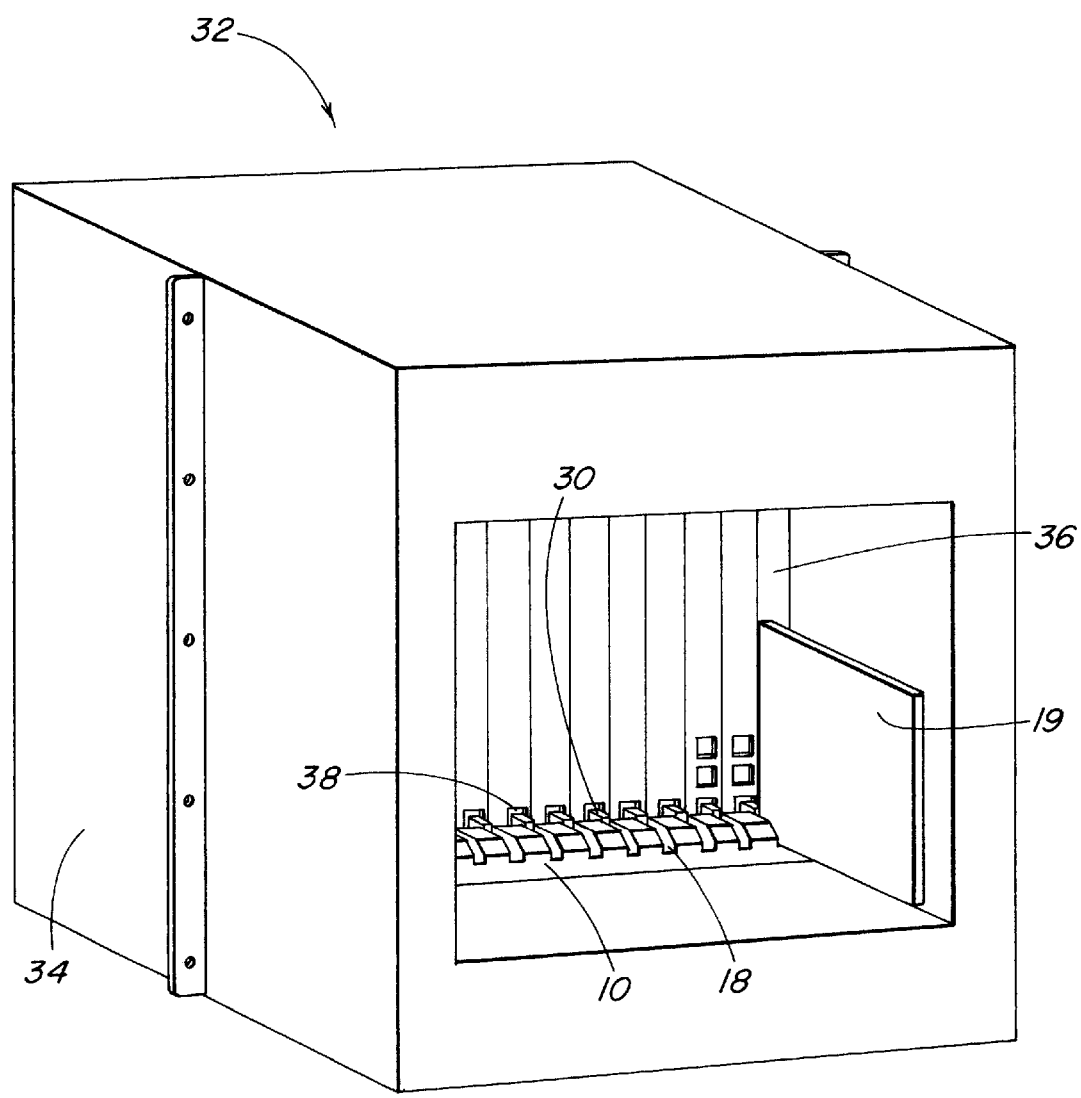
FIG. 5 is a perspective illustration of an optical switch incorporating the cartridge, according to one embodiment of the present invention.

Looking now at FIGS. 1A, 1B, and 5, the cartridge 10 of the invention is shown in operation. The otherwise flat but flexible optical backplane 26 bends and is disposed within the structure of the cartridge 10 such that the optical connectors 30 extend through the optical connector slots 16. The interior dimensions of the upper portion 14 of the cartridge 10 maintain the optical backplane 26 in a state of flex having the aforementioned predetermined radius of curvature allowable for the fibers within the optical backplane 26. For example, the embodiment illustrated has an optical backplane 26 radius of curvature of approximately 1 inch.

The optical connector slots 16 hold the optical connectors 30 in place and in proper position for coupling with one or more optical ports 38 of a backplane 36 within a housing 34 of an optical component such as e.g., an optical switch 32. A friction fit between the optical connectors 30 and the edges of the optical connector slots 16 can help to hold the optical connectors 30 in place. However, the friction fit is not required. The optical connector slots 16 can be slightly larger than what would be required for a friction fit, and still maintain some support for properly positioning the optical connectors 30. There can additionally be one or more fastening devices for mounting the optical connectors 30 to the upper portion 14 or the optical connector slots 16 as is appreciable by one of ordinary skill in the art.

The optical card slots 18 hold the optical cards 19 in place to couple as desired with the backplane 36 within the housing 34 of the optical switch 32. There can likewise be a friction fit between the optical cards 19 and the optical card slots 18 to hold the optical cards 19 in place. Alternatively, the optical card slots can be slightly larger than the size required for a friction fit. The size and shape of the optical card slots 18 must be sufficient to adequately support the optical cards 19 without damaging the cards 19, or allowing excessive movement of the cards 19 when installed that could lead to further damage. The optical card slots 18 can additionally contain one or more fastening mechanisms (not shown) to hold the optical cards 19 in place as is appreciable by one of ordinary skill in the art.

The optical cards 19 generally rest in the optical card slots 18 of the upper portion 14. The back of the optical card slot 18 prevents the optical card 19 from being inserted too far, while the front edge of the optical card slot 18 supports the corner of the optical card 19.

The cartridge 10 mounts to a base of the housing 34 utilizing the thumb screws 22 or the threaded apertures 20 with threaded fasteners. The shell provided by the upper portion 14 and the base 12 of the cartridge 10 further protects the optical backplane 26 within the cartridge 10 from other items within the optical switch 32. For example, such structures as optical cards, optical components, or other structures, may press against unprotected optical fibers of the optical backplane 26, and undesirably crush the fibers.

In addition, the optical connector slots 16 of the upper portion 14 simplify the installation of the optical backplane 26 into the optical switch 32 because the optical connectors 30 are properly positioned by the optical connector slots 16 for connection with the optical ports 38 of the backplane 36. The optical connector slots 16 further reduce the likelihood of entanglements of the optical fibers and optical connectors 30 with each other an with other objects, by maintaining the optical connectors 30 in the proper arrangement.

Optical components such as the optical switch 32 often contain a predetermined airflow path or paths within the unit for cooling of internal components, including electrical components, contained within the optical switch 32. One or more fans (not shown) can facilitate the air flow paths. The cartridge 10 maintains a unique structure that facilitates the channeling of airflow around each of the optical leads 28 of the optical backplane 26, while effectively protecting the optical fibers contained within the optical backplane 26. The flow of air can also pass over the outside of the cartridge 10 for further cooling effect. The generally cylindrical shape of the cartridge 10 channels the airflow through the center of the structure, while also providing a plurality of apertures for air to pass through and additionally cool the optical switch 32.

Further, the optical leads 28 and the optical connectors 30 are substantially held in place by the cartridge 10 to hinder vibration. The vibration can otherwise occur with the flow of air, or through other sources of vibration within an optical switch 32, thus reducing occurrences of damage to optical fibers resulting from such vibrations.

The structure of the cartridge 10 additionally provides some protection for the more delicate optical backplane 26 from other components within the optical switch 32. The cartridge 10 can resist deformation if, during installation or otherwise, a component or other object accidentally presses against the cartridge 10. In previous arrangements, the optical backplane 26 hangs unprotected within the switch, and could be damaged by other objects in the switch 32. However, in accordance with the present invention, the optical backplane 26 is installed within the cartridge 10, resting against the walls of the cartridge that support the optical backplane 26 in a manner such that the optical backplane 26 forms a predetermined radius of curvature greater than a radius of curvature required by optical fibers internal to the optical backplane 26 to avoid damage to the optical fibers. The structure of the cartridge 10 provides an extra level of protection for the optical backplane 26, and thus reduces the likelihood of damaging the optical fibers.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A cartridge for supporting an optical backplane, comprising:

a base;

an upper portion coupled with the base, wherein walls of the upper portion approximate a predetermined radius of curvature; and optical connector slots for supporting one or more optical connectors of the optical backplane disposed within the cartridge.

2. The cartridge of claim 1, wherein the optical backplane mounts within the upper portion such that the predetermined radius of curvature of the upper portion supports the optical backplane in a predetermined range of radius of curvature.

3. The cartridge of claim 1, wherein the optical connector slots are sized and dimensioned to support and mount the one or more optical connectors with a friction fit.

4. The cartridge of claim 1, wherein the cartridge is made of a material selected from the list of metal, plastic, composite, ceramic, and wood.

5. The cartridge of claim 1, further comprising optical card slots disposed in the upper portion for supporting one or more optical cards.

6. The cartridge of claim 1, wherein the optical card slots are sized and dimensioned to support at least a portion of the one or more optical cards with a friction fit.

7. The cartridge of claim 1, wherein the cartridge is sized and dimensioned to facilitate a flow of air therethrough for cooling.

8. An optical component, comprising: a housing; at least one plane disposed within the housing; a cartridge disposed within the housing proximal to the at least one plane, said cartridge comprises a base, an upper portion, wherein the walls of the upper portion together with the base portion, approximate a predetermined radius of curvature, and optical connector slots for supporting one or more optical connectors; and an optical backplane disposed within the cartridge such that one or more optical connectors coupled with the optical backplane are supported by the cartridge and one or more connectors further couple with the at least one plane.

9. The optical component of claim 8, wherein the optical backplane mounts within the upper portion and the base portion such that the predetermined radius of curvature of the upper portion and base portion supports the optical backplane in a predetermined range of radius of curvature.

10. The optical component of claim 8, wherein the cartridge comprises one or more optical connector slots.

11. The optical component of claim 10, wherein the one or more optical connector slots are sized and dimensioned to support and mount the optical connectors with a friction fit.

12. The optical component of claim 8, wherein the cartridge is made of a material selected from the group of metal, plastic, composite, ceramic, and wood.

13. The optical component of claim 8, wherein the cartridge comprises one or more optical card slots disposed in the upper portion for supporting one or more optical cards.

14. The optical component of claim 13, wherein the one or more optical card slots are sized and dimensioned to support and mount at least a portion of the one or more optical cards with a friction fit.

15. The optical component of claim 8, wherein the cartridge is sized and dimensioned to facilitate a flow of air therethrough for cooling.

16. The optical component of claim 8, wherein the base of the cartridge is coupled with the housing with at least one of a locking device, a fastening device, a weld, and adhesive.

17. The optical component of claim 8, wherein the plane comprises one of a mid-plane and a backplane.

* * * * *